United States Patent
Inoue (10) Patent No.: US 9,987,935 B2
(45) Date of Patent: Jun. 5, 2018

(54) NON-CONTACT POWER TRANSMITTING/RECEIVING SYSTEM AND POWER RECEIVING DEVICE AND POWER TRANSMISSION DEVICE IN NON-CONTACT POWER TRANSMITTING/RECEIVING SYSTEM

(71) Applicant: TOYOTA JIDOSHA KABUSHIKI KAISHA, Toyota-shi, Aichi-ken (JP)

(72) Inventor: Junji Inoue, Tokai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 241 days.

(21) Appl. No.: 14/833,733

(22) Filed: Aug. 24, 2015

(65) Prior Publication Data

US 2016/0075240 A1 Mar. 17, 2016

(30) Foreign Application Priority Data

Sep. 17, 2014 (JP) ................................. 2014-189063

(51) Int. Cl.
*H02J 7/00* (2006.01)
*B60L 11/18* (2006.01)
*H02J 50/10* (2016.01)
*H02J 50/80* (2016.01)

(52) U.S. Cl.
CPC ......... *B60L 11/182* (2013.01); *B60L 11/1811* (2013.01); *B60L 11/1838* (2013.01); *H02J 50/10* (2016.02); *H02J 50/80* (2016.02)

(58) Field of Classification Search
CPC ...................................................... H02J 50/80

USPC .......................................................... 320/108
See application file for complete search history.

(56) References Cited

U.S. PATENT DOCUMENTS

| 5,341,083 | A | * | 8/1994 | Klontz | ................ | B60L 11/1816 |
|---|---|---|---|---|---|---|
| | | | | | | 320/109 |
| 2012/0235636 | A1 | * | 9/2012 | Partovi | .................... | H02J 7/025 |
| | | | | | | 320/108 |
| 2012/0242285 | A1 | | 9/2012 | Jung et al. | | |
| 2013/0154382 | A1 | | 6/2013 | Kurata et al. | | |
| 2013/0300204 | A1 | * | 11/2013 | Partovi | ................... | H01F 38/14 |
| | | | | | | 307/104 |
| 2013/0300354 | A1 | | 11/2013 | Ichikawa et al. | | |
| 2014/0001879 | A1 | | 1/2014 | Van Wageningen | | |
| 2014/0333258 | A1 | | 11/2014 | Matsukura et al. | | |

(Continued)

FOREIGN PATENT DOCUMENTS

JP 2012-205500 A 10/2012
JP 2013-119275 A 6/2013

(Continued)

*Primary Examiner* — Suresh Memula
(74) *Attorney, Agent, or Firm* — Oliff PLC (57) ABSTRACT

A non-contact power transmitting/receiving system calculates a loss Plo as a power difference between a transmitted power Ptr of a power transmission unit of a power transmission device and a received power Pre of a power receiving unit of a power receiving device. The non-contact power transmitting/receiving system sets a smaller value to a target transmitted power Ptr* when the calculated loss Plo is greater than a reference value Ploref, than a value when the calculated loss Plo is equal to or less than the reference value Ploref, and controls a high-frequency power circuit with the set target transmitted power Ptr*.

10 Claims, 3 Drawing Sheets

(56) References Cited

U.S. PATENT DOCUMENTS

| | | | |
|---|---|---|---|
| 2014/0368166 A1* | 12/2014 | Oishi | B60L 11/182 320/108 |
| 2014/0371966 A1 | 12/2014 | Ohashi et al. | |
| 2016/0221459 A1* | 8/2016 | Jung | H02J 17/00 |
| 2017/0163099 A1* | 6/2017 | Kanno | H02J 50/12 |

FOREIGN PATENT DOCUMENTS

| | | |
|---|---|---|
| JP | 2013-123306 A | 6/2013 |
| JP | 2013-128400 A | 6/2013 |
| JP | 2013-198356 A | 9/2013 |
| JP | 2013-198357 A | 9/2013 |
| JP | 2013-240132 A | 11/2013 |
| JP | 2014-512158 A | 5/2014 |

* cited by examiner

NON-CONTACT POWER TRANSMITTING/RECEIVING SYSTEM AND POWER RECEIVING DEVICE AND POWER TRANSMISSION DEVICE IN NON-CONTACT POWER TRANSMITTING/RECEIVING SYSTEM

This application claims priority to Japanese Patent Application No. 2014-189063 filed 17 Sep. 2014, the contents of which is incorporated herein by reference.

TECHNICAL FIELD

The present invention relates to a non-contact power transmitting/receiving system, as well as to a power receiving device and a power transmission device in this non-contact power transmitting/receiving system. More specifically the invention relates to a non-contact power transmitting/receiving system including a power transmission device and a vehicle equipped with a battery and a power receiving device that is configured to receive electric power in a contactless manner from the power transmission device and charge the battery, as well as to the power receiving device and the power transmission device in this non-contact power transmitting/receiving system.

BACKGROUND ART

A proposed non-contact power transmitting/receiving system includes a power transmission device and a vehicle equipped with a power storage device and a power receiving device that is configured to receive electric power in a contactless manner from the power transmission device and charge the power storage device (see, for example, JP 2013-198357A). In this non-contact power transmitting/receiving system, the power transmission device has a power transmitter that is configured as a resonance circuit including a coil, a power supply that is configured to supply a high-frequency AC power to the power transmitter, and a first cooling unit that is configured to blow a cooling blast to the coil of the power transmitter. The power receiving device has a power receiver that is configured as a resonance circuit including a coil to receive electric power in a contactless manner from the power transmitter, a rectifier that is configured to convert an AC power received by the power receiver into a DC power and supply the converted DC power to the power storage device, and a second cooling unit that is configured to blow a cooling blast to the coil of the power receiver.

CITATION LIST

Patent Literature

Patent Document 1: Japanese Patent Laid-Open No. JP 2013-198357A

SUMMARY OF INVENTION

Technical Problem

In the non-contact power transmitting/receiving system described above, the cooling units are provided in the vicinity of the coil of the power transmitter and in the vicinity of the coil of the power receiver. This causes size expansion and increases the total number of components of the power transmission device and the power receiving device. In this system, heat loss in each component of the power receiving device (for example, the power receiver) may cause the temperature of the component to increase to a relatively high temperature. A positional misalignment between the coil of the power transmitter and the coil of the power receiver or the like may cause the magnetic flux from the power transmitter to run through the periphery of the power receiver (for example, floor panel) and may increase the temperature of the periphery to a relatively high temperature. One possible measure to suppress such temperature increases is to provide an additional cooling unit. This, however, causes size expansion and increases the total number of components of, for example, the power receiving device.

With regard to the non-contact power transmitting/receiving system and the power receiving device and the power transmission device in this non-contact power transmitting/receiving system, an object of the invention is to suppress the temperature of the power receiving device and its periphery from increasing to a relatively high temperature, while suppressing size expansion and an increase in total number of components of the power receiving device.

Solution to Problem

In order to achieve the object described above, the invention may be implemented by a non-contact power transmitting/receiving system, as well as by a power receiving device and a power transmission device in this non-contact power transmitting/receiving system of any of aspects described below.

According to one aspect of the invention, there is provided a non-contact power transmitting/receiving system including: a power transmission device; and a vehicle including a battery and a power receiving device that is configured to receive electric power from the power transmission device in a contactless manner and charge the battery, wherein in course of charging the battery with an electric power transmitted from the power transmission device to the power receiving device in a contactless manner, a transmitted power of the power transmission device is reduced when a power difference between the transmitted power of the power transmission device and a received power of the power receiving device is greater than a reference value, than the transmitted power when the power difference is equal to or less than the reference value.

In the non-contact power transmitting/receiving system of this aspect, in course of charging the battery with the electric power transmitted from the power transmission device to the power receiving device in a contactless manner, the transmitted power of the power transmission device is reduced when the power difference between the transmitted power of the power transmission device and the received power of the power receiving device is greater than the reference value, than the transmitted power when the power difference is equal to or less than the reference value. When the power difference is greater than the reference value, there is a large loss in power transmission and power receiving between the power transmission device and the power receiving device. This may cause relatively large heat generation in each component of the power receiving device and relatively large heat generation in the periphery of the power receiving device. This is likely to increase the temperature of the component and the temperature of the periphery to relatively high temperatures. Reducing the transmitted power of the power transmission device when the power difference is greater than the reference value, than the transmitted power when the power difference is equal to or less than the reference value suppresses heat generation in each component of the power receiving device and heat generation in the periphery of the power receiving device and thereby suppresses the temperature of the component and the temperature of the periphery from increasing to relatively high temperatures. Additionally, this configuration suppresses size expansion or an increase in total number of components of, for example, the power receiving device, compared with a configuration equipped with a cooling device for cooling down such respective parts. The "transmitted power of the power transmission device" herein may denote a transmitted power detected by a transmitted power detector that is configured to detect the transmitted power. The "received power of the power receiving device" herein may denote a received power detected by a received power detector that is configured to detect the received power or may be a charging power detected by a charging power detector that is configured to detect the charging power of the battery.

DESCRIPTION OF EMBODIMENTS

The following describes some aspects of the invention with reference to embodiments.

Figure 1:
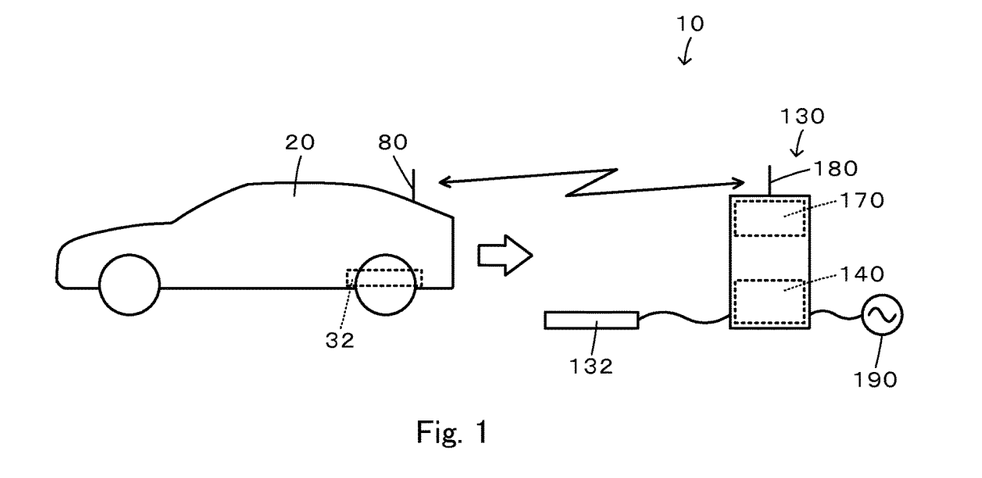
FIG. 1 is a configuration diagram schematically illustrating the configuration of a non-contact power transmitting/receiving system according to one embodiment of the invention.
Figure 2:
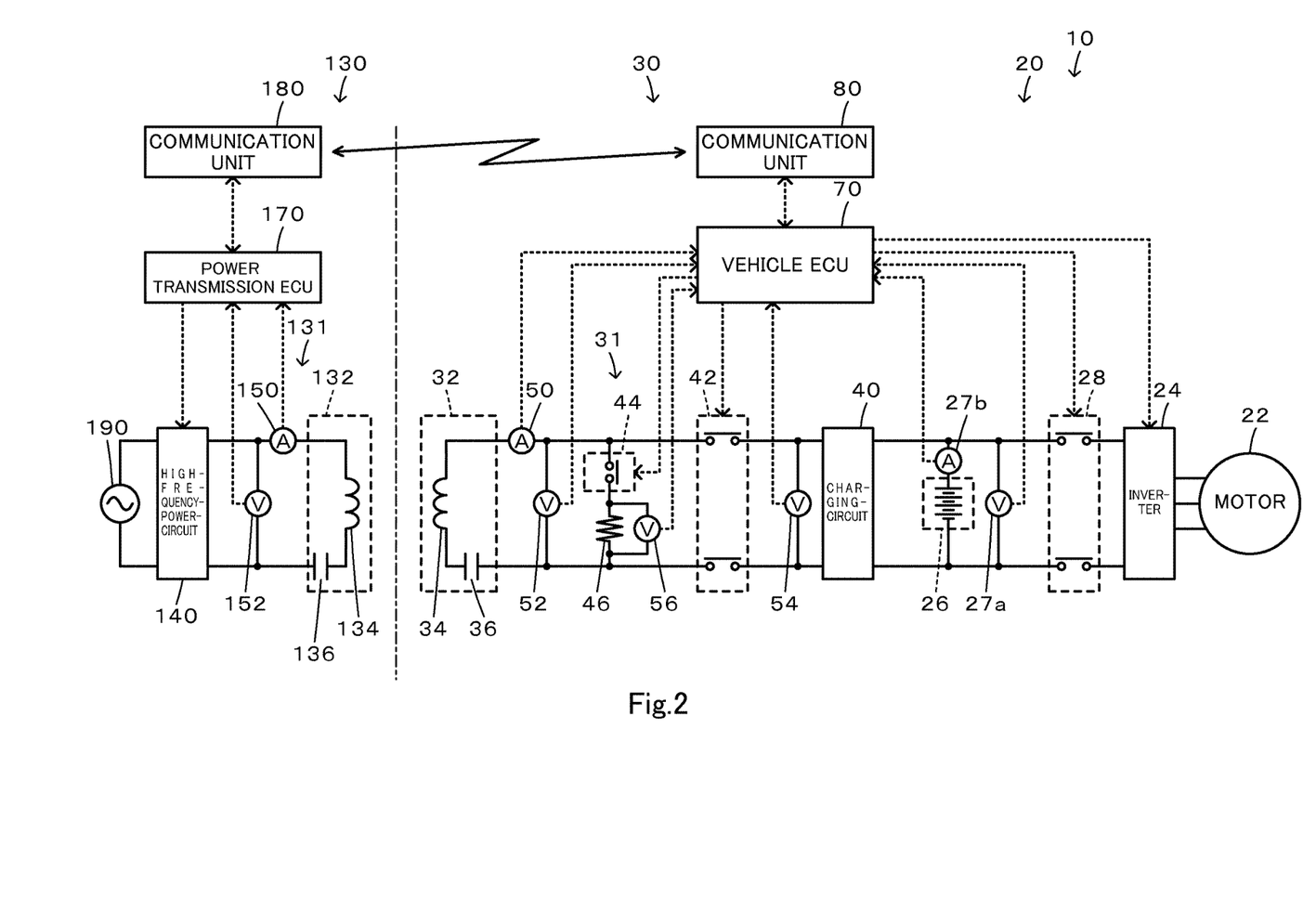
FIG. 2 is a configuration diagram schematically illustrating the configuration of the non-contact power transmitting/receiving system according to the embodiment of the invention.

FIGS. 1 and 2 are configuration diagrams schematically illustrating the configuration of a non-contact power transmitting/receiving system 10 according to one embodiment of the invention. As shown in FIGS. 1 and 2, the non-contact power transmitting/receiving system 10 of the embodiment includes a power transmission device 130 that is placed in, for example, a parking space and a motor vehicle 20 equipped with a battery 26 and a power receiving device 30 that is configured to receive electric power from the power transmission device 130 in a contactless manner and charge the battery 26.

The power transmission device 130 includes a power transmission unit 131 that is connected with an AC power supply 190 such as household power supply (for example, 200 V, 50 Hz), an electronic control unit for power transmission (hereinafter called "power transmission ECU") 170 that is configured to control the power transmission unit 131, and a communication unit 180 that is configured to communicate with the power transmission ECU 170 and wirelessly communicate with a communication unit 80 (described later) of the motor vehicle 20.

The power transmission unit 131 includes a power transmission resonance circuit 132 and a high-frequency power circuit 140 that is provided between the AC power supply 190 and the power transmission resonance circuit 132. The power transmission resonance circuit 132 includes a power transmission coil 134 that is placed on, for example, the floor surface of a parking space and a capacitor 136 that is connected in series with the power transmission coil 134. This power transmission resonance circuit 132 is designed to control the resonance frequency to a predetermined frequency Fset (about several ten to several hundred kHz). The high-frequency power circuit 140 is configured as a circuit to convert the electric power from the AC power supply 190 into an electric power of the predetermined frequency Fset and output the converted electric power to the power transmission resonance circuit 132 and includes, for example, a filter, a frequency conversion circuit and an earth leakage breaker.

The power transmission ECU 170 is implemented by a CPU-based microprocessor and includes a ROM that stores processing programs, a RAM that temporarily stores data, input and output ports and a communication port other than the CPU, although not being illustrated. The power transmission ECU 170 inputs, via the input port, for example, an electric current Itr of the power transmission resonance circuit 132 from a current sensor 150 configured to detect an AC current flowing in the power transmission resonance circuit 132 and an inter-terminal voltage (transmitted power voltage) Vtr of the power transmission resonance circuit 132 from a voltage detection unit 152 configured to convert an AC voltage between terminals of the power transmission resonance circuit 132 into a DC voltage and detect the converted DC voltage. The voltage detection unit 152 includes a rectifier circuit and a voltage sensor. The power transmission ECU 170 outputs, via the output port, for example, controls signals to the high-frequency power circuit 140.

The motor vehicle 20 is configured as an electric vehicle and includes a motor 22 for running, an inverter 24 that is configured to drive the motor 22, the battery 26 that is configured to transmit electric power to and from the motor 22 via the inverter 24, a system main relay 28 that is provided between the inverter 24 and the battery 26, a power receiving unit 31 that is connected with the battery 26, a vehicle electronic control unit (hereinafter referred to as "vehicle ECU") 70 that is configured to control the entire vehicle, and the communication unit 80 that is configured to communicate with the vehicle ECU 70 and wirelessly communicate with the communication unit 180 of the power transmission device 130.

The power receiving unit 31 includes a power-receiving resonance circuit 32, a charging circuit 40 that is provided between the power receiving resonance circuit 32 and the battery 26, a charging relay 42 that is provided between the power receiving resonance circuit 32 and the charging circuit 40, and a relay 44 and a resistance 46 that are provided between the power receiving resonance circuit 32 and the charging relay 42 and are arranged in parallel to the power receiving resonance circuit 32 and in series with each other. The power-receiving resonance circuit 32 includes, for example, a power receiving coil 34 that is placed on, for example, the bottom surface of the vehicle body (floor panel) and a capacitor 36 that is connected in series with the power receiving coil 34. This power-receiving resonance circuit 32 is designed to control the resonance frequency to a frequency around the predetermined frequency Fset described above (resonance frequency of the power transmission resonance circuit 132) (ideally to the predetermined frequency Fset). The charging circuit 40 is configured as a circuit to convert an AC power received by the power-receiving resonance circuit 32 into a DC power and supply the converted DC power to the battery 26 and includes a rectifier circuit and a smoothing circuit. The charging relay 42 is configured to connect and disconnect the power-receiving resonance circuit 32-side with and from the charging circuit 40-side. The relay 44 is configured to connect and disconnect a positive electrode line between the power-receiving resonance circuit 32 and the charging relay 42 with and from the other terminal of the resistance 46 that has one terminal connected with a negative electrode line between the power-receiving resonance circuit 32 and the charging relay 42.

The vehicle ECU 70 is implemented by a CPU-based microprocessor and includes a ROM that stores processing programs, a RAM that temporarily stores data, input and output ports and a communication port other than the CPU, although not being illustrated. The vehicle ECU 70 inputs, via the input port, for example, a rotational position θm of a rotor of the motor 22 from a rotational position detection sensor configured to detect the rotational position of the rotor of the motor 22, phase currents Iu, Iv and Iw from a current sensor configured to detect phase currents flowing through the respective phases of a three-phase coil of the motor 22, a battery voltage Vb from a voltage sensor 27a placed between terminals of the battery 26, a battery current Ib from a current sensor 27b mounted to the positive electrode terminal of the battery 26 and a battery temperature Tb from a temperature sensor configured to detect the temperature of the battery 26. The vehicle ECU 70 also inputs, via the input port, an electric current Ire of the power-receiving resonance circuit 32 from a current sensor 50 configured to detect an AC current flowing in the power-receiving resonance circuit 32 and an inter-terminal voltage (received power voltage) Vre1 of the power-receiving resonance circuit from a voltage detection unit 52 configured to convert an AC voltage between terminals of the power-receiving resonance circuit 32 into a DC voltage and detect the converted DC voltage. Additionally, the vehicle ECU 70 inputs, via the input port, an inter-terminal voltage Vre2 on the input side of the charging circuit 40 from a voltage detection unit 54 configured to convert an AC voltage between the charging circuit 40 and the charging relay 42 and between the positive electrode line and the negative electrode line (inter-terminal voltage on the input side of the charging circuit 40) into a DC voltage and detect the converted DC voltage, an inter-terminal voltage Vre3 of the resistance 46 from a voltage detection unit 56 configured to convert an AC voltage between terminals of the resistance 46 into a DC voltage and detect the converted DC voltage, and a temperature Tre of the power-receiving resonance circuit 32 from a temperature sensor attached to, for example, a substrate which the power-receiving resonance circuit 32 is mounted to. Furthermore, the vehicle ECU 70 inputs, via the input port, an ignition signal from an ignition switch (start switch), a gearshift position SP from a gearshift positions sensor configured to detect an operating position of a gearshift lever, an accelerator position Acc from an accelerator pedal positions sensor configured to detect a depression amount of an accelerator pedal, a brake pedal position BP from a brake pedal position sensor configured to detect a depression amount of a brake pedal and a vehicle speed V from a vehicle speed sensor. Each of the voltage detection units 52, 54 and 56 includes a rectifier circuit and a voltage sensor. The vehicle ECU 70 outputs, via the output port, for example, switching control signals to switching elements (not shown) of the inverter 24, on-off signals to the system main relay 28, on-off signals to the charging relay 42 and on-off signals to the relay 44. The vehicle ECU 70 calculates a state of charge SOC of the battery 26, based on an integral value of the battery current Ib of the battery 26 detected by the current sensor 27b.

According to this embodiment, the power receiving device 30 mainly includes the power receiving unit 31, the vehicle ECU 70 and the communication unit 80.

In the non-contact power transmitting/receiving system 10 of the embodiment having the above configuration, in the state that the power transmission coil 134 of the power transmission resonance circuit 132 is placed close to the power receiving coil 34 of the power-receiving resonance circuit 32 and that either the charging relay 42 or the relay 44 is turned on, supply of electric power of the predetermined frequency Fset from the AC power supply 190 to the power transmission resonance circuit 132 via the high-frequency power circuit 140 causes the resonance of the power transmission coil 134 with the power receiving coil 34 via an electromagnetic field and thereby leads to the transfer of energy (electric power) from the power transmission coil 134 to the power receiving coil 34. The transfer of energy caused by the resonance is enabled when a Q value representing strength of resonance of the power transmission coil 134 with the power receiving coil 34 is equal to or greater than a predetermined reference value Qref (for example, 100).

In this non-contact power transmitting/receiving system 10, during running of the motor vehicle 20, while the vehicle ECU 70 performs switching control of the switching elements of the inverter 24 to drive the motor 22 with a required torque Tr* for running set according to the accelerator position Acc and the vehicle speed V in the state that the system main relay 28 is on and the charging relay 42 and the relay 44 are off.

During moving of the motor vehicle 20, a charging request for the battery 26 is output from the vehicle ECU 70 via the communication unit 80. When the power transmission ECU 170 receives the charging request for the battery 26 via the communication unit 180, the power transmission ECU 170 and the vehicle ECU 70 start communication via the communication units 180 and 80. After the start of communication between the power transmission ECU 170 and the vehicle ECU 70, when the motor vehicle 20 approaches to a certain distance from a contactless charging position in, for example, a parking place (position where the power transmission coil 134 of the power transmission resonance circuit 132 substantially faces the power receiving coil 34 of the power-receiving resonance circuit 32) which is suitable for contactless charging that charges the battery 26 with electric power transmitted from the power transmission unit 131 to the power receiving unit 31 in a contactless manner, the vehicle ECU 70 turns on the relay 44, and the power transmission ECU 170 starts controlling the high-frequency power circuit 140 to supply a weak electric power to the power transmission coil 134. In general, as the power transmission coil 134 comes closer to the power receiving coil 34, the electric power transmitted from the power transmission coil 134 to the power receiving coil 34 increases, so as to increase the electric power supplied to the resistance 46. Accordingly, the distance between the power transmission coil 134 and the power receiving coil 34 may be estimated by using the inter-terminal voltage Vre3 of the resistance 46 detected by the voltage detection unit 56. The vehicle ECU 70 then estimates the positional relationship (distance and direction) of the power transmission coil 134 and the power receiving coil 34, based on the inter-terminal voltage Vre3 of the resistance 46 and a peripheral image of the motor vehicle 20 taken by a camera (not shown) and shows this positional relationship or the like on a display of a navigation system (not shown), so as to guide the motor vehicle 20 to approach the contactless charging position and stop the motor vehicle 20 at the contactless charging position.

When the motor vehicle 20 is stopped (parked) near the contactless charging position and turns off the ignition, the vehicle ECU 70 turns off the system main relay 28 and the relay 44, turns on the charging relay 42 that has been kept off, and sends a power transmission start request (request for starting charging of the battery 26) to the power transmission ECU 170 via the communication units 80 and 180. When receiving the power transmission start request, the power transmission ECU 170 controls the high-frequency power circuit 140, such as to supply a larger electric power (electric power for charging the battery 26) that is larger than the above weak electric power to the power transmission coil 134. In the motor vehicle 20, the power receiving coil 34 receives electric power from the power transmission coil 134 in a contactless manner, and the charging circuit 40 converts the received AC power into a DC power and supplies the converted DC power to the battery 26. This charges the battery 26. When the state of charge SOC of the battery 26 reaches a reference value Sref (for example, 80%, 85% or 90%) that is to terminate charging, the vehicle ECU 70 sends a power transmission end request (request for terminating charging of the battery 26) to the power transmission ECU 170 via the communication units 80 and 180. When receiving the power transmission end request, the power transmission ECU 170 stops the operation of the high-frequency power circuit 140. The vehicle ECU 70 also turns off the charging relay 42. This terminates charging of the battery 26.

Figure 3:
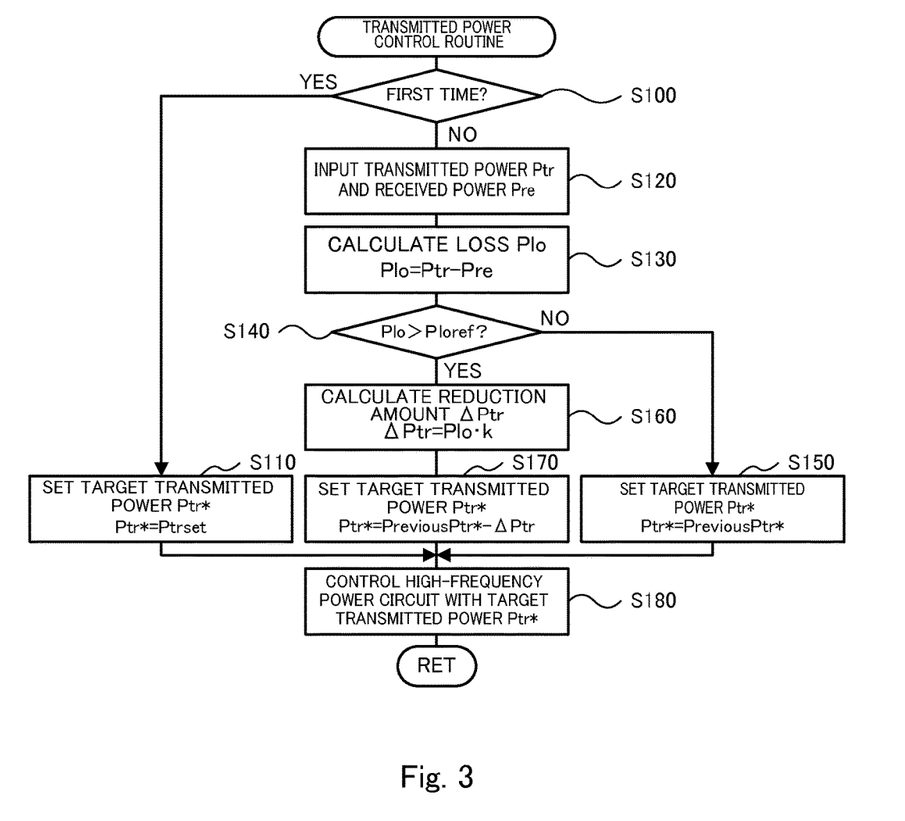
FIG. 3 is a flowchart showing one exemplary flow of a transmitted power control routine performed by a power transmission ECU.

In the course of contactless power transmission from the power transmission unit 131 of the power transmission device 130 to the power receiving unit 31 of the power receiving device 30 to charge the battery 26, the power transmission ECU 170 performs a transmitted power control routine shown in FIG. 3 to adjust a transmitted power Ptr of the power transmission unit 131 of the power transmission device 130. This transmitted power control routine is performed repeatedly from a start to an end of power transmission by the power transmission device 130 (i.e., from a start to an end of charging of the battery 26).

On start of the transmitted power control routine, the power transmission ECU 170 first determines whether the current time is a first time of performing this routine (prior to a start of power transmission) (step S100). When the current time is the first time of performing this routine, the power transmission ECU 170 sets a predetermine electric power Ptrset to a target transmitted power Ptr* (step S110), controls the high-frequency power circuit 140 to supply the set target transmitted power Ptr* to the power transmission coil 134 (step S180) and terminates this routine. The predetermined electric power Ptrset may be a value specified in advance as an initial value or may be a requested transmitted power when the requested transmitted power is received from the vehicle ECU 70.

When the current time is not the first time of performing this routine but is a second or subsequent time of performing this routine at step S100, the power transmission ECU 170 inputs a transmitted power Ptr of the power transmission unit 131 and a received power Pre of the power receiving unit 31 (step S120). The transmitted power Ptr of the power transmission unit 131 may be a value calculated from the electric current Itr of the power transmission resonance circuit 132 detected by the current sensor 150 and the inter-terminal voltage Vtr of the power transmission resonance circuit 132 detected by the voltage detection unit 152. The received power Pre of the power receiving unit 31 may be a value (received power of the power-receiving resonance circuit 32) that is calculated from the electric current Ire of the power-receiving resonance circuit 32 detected by the current sensor 50 and the inter-terminal voltage Vre1 of the power-receiving resonance circuit 32 detected by the voltage detection unit 52 and is input by communication from the vehicle ECU 70 via the communication units 80 and 180 or may be a value (input-output power Pb of the battery 26) that is calculated from the battery voltage Vb detected by the voltage sensor 27a and the battery current Ib detected by the current sensor 27b and is input as the received power by communication from the vehicle ECU 70 via the communication units 80 and 180.

After the data input, the power transmission ECU 170 subtracts the input received power Pre from the input transmitted power Ptr to calculate a loss Plo (step S130) and compares the calculated loss Plo with a reference value Ploref (step S140). The reference value Ploref is used as a criterion for determining whether a loss is relatively large or not and is determined based on, for example, the specifications of the power transmission unit 131 and the power receiving unit 31. In the case of the large loss Plo, a positional misalignment between the power transmission coil 134 and the power receiving coil 34 may cause the magnetic flux from the power transmission coil 134 to run through the periphery of the power receiving coil 34 (for example, the floor panel). This may result in increasing the temperature in the periphery to a relatively high temperature. In the case of the large loss Plo, heat loss of each component of the power receiving unit 31 (for example, power-receiving resonance circuit 32) or the like may result in increasing the temperature of the component to a relatively high temperature. The processing of step S140 identifies whether there is such a potential.

When the loss Plo is equal to or less than the reference value Ploref at step S140, it is determined that the loss Plo is not so large. The power transmission ECU 170 then sets a target transmitted power set in a previous cycle of this routine (previous Ptr*) to the current target transmitted power Ptr* (step S150), controls the high-frequency power circuit 140 to supply the set target transmitted power Ptr* to the power transmission coil 134 (step S180) and terminates this routine.

When the loss Plo is greater than the reference value Ploref at step S140, on the other hand, it is determined that the loss Plo is relatively large. The power transmission ECU 170 then multiplies the loss Plo by a factor k that is greater than a value 0 but is not greater than a value 1 to calculate a reduction amount ΔPtr of the transmitted power Ptr (step S160) and subtracts the calculated reduction amount ΔPtr from the target transmitted power set in the previous cycle of this routine (previous Ptr*) to calculate the current target transmitted power Ptr* (step S170). The power transmission ECU 170 subsequently controls the high-frequency power circuit 140 to supply the set target transmitted power Ptr* to the power transmission coil 134 (step S180) and terminates this routine. Reducing the transmitted power Ptr of the power transmission unit 131 in this manner suppresses heat generation in the periphery of the power receiving coil 34 (for example, floor panel) and heat generation of each component of the power receiving unit 31 (for example, power-receiving resonance circuit 32) and thereby suppresses the temperature of the periphery and the temperature of the component from increasing to relatively high temperatures. Additionally, this configuration suppresses size expansion or an increase in total number of components of, for example, the power receiving device 30, compared with a configuration equipped with a cooling device for cooling down such respective parts.

According to the embodiment, this routine is performed repeatedly, so as to gradually reduce the target transmitted power Ptr* of the power transmission unit 131 until the loss Plo becomes equal to or less than the reference value Ploref. This more effectively suppresses heat generation in the respective parts described above.

In the non-contact power transmitting/receiving system 10 of the embodiment described above, when the loss Plo obtained as the power difference between the transmitted power Ptr of the power transmission unit 131 of the power transmission device 130 and the received power Pre of the power receiving unit 31 of the power receiving device 30 is greater than the reference value Ploref, the smaller value is set to the target transmitted power Ptr* than the value when the loss Plo is equal to or less than the reference value Ploref, and the high-frequency power circuit 140 is controlled with such setting. This suppresses heat generation in the periphery of the power receiving coil 34 (for example, floor panel) and heat generation of each component of the power receiving unit 31 (for example, power-receiving resonance circuit 32) and thereby suppresses the temperature of the periphery and the temperature of the component from increasing to relatively high temperatures. Additionally, this configuration suppresses size expansion or an increase in total number of components of, for example, the power receiving device 30, compared with a configuration equipped with a cooling device for cooling down such respective parts.

In the non-contact power transmitting/receiving system 10 of the embodiment, when the loss Plo is greater than the reference value Ploref, the target transmitted power Ptr* of the power transmission unit 131 is gradually reduced until the loss Plo becomes equal to or less than the reference value Ploref. According to another embodiment, the target transmitted power Ptr* may be reduced only once such that the larger loss Plo provides the larger reduction.

In the non-contact power transmitting/receiving system 10 of the embodiment, when the loss Plo is greater than the reference value Ploref, the target transmitted power Ptr* of the power transmission unit 131 is reduced by the reduction amount ΔPtr that is obtained by multiplying the loss Plo by the factor k. According to another embodiment, the target transmitted power Ptr* may be reduced by a predetermined reduction amount ΔPtrset (fixed value).

In the non-contact power transmitting/receiving system 10 of the embodiment, when the loss Plo is greater than the reference value Ploref, the power transmission ECU 170 gradually reduces the target transmitted power Ptr* of the power transmission unit 131 until the loss Plo becomes equal to or less than the reference value Ploref. According to another embodiment, when the target transmitted power Ptr* is reduced below a relatively small reference value Ptrref, the power transmission ECU 170 may determine that a positional misalignment between the power transmission coil 134 and the power receiving coil 34 is greater than an allowable range and send an adjustment signal to adjust the position of the vehicle (position of the power transmission coil 134) to the vehicle ECU 70 via the communication units 180 and 80. When receiving the adjustment signal, the vehicle ECU 70 may show information of the adjustment signal on a display and urge the driver to adjust the position of the vehicle.

In the non-contact power transmitting/receiving system 10 of the embodiment, the power transmission ECU 170 performs the transmitted power control routine of FIG. 3 to set the target transmitted power Ptr* according to the loss Plo and control the high-frequency power circuit 140. According to another embodiment, the vehicle ECU 70 may set the target transmitted power Ptr* according to the loss Plo like the routine of FIG. 3 and send the set target transmitted power Ptr* to the power transmission ECU 170. The power transmission ECU 170 may control the high-frequency power circuit 140 with the target transmitted power Ptr* received from the vehicle ECU 70.

In the non-contact power transmitting/receiving system 10 of the embodiment, in the power transmission unit 31 of the power receiving device 30 mounted on the motor vehicle 20, the power-receiving resonance circuit 32, the relay 44 and the resistance 46, the charging relay 42, and the charging circuit 40 are arranged in this sequence from the power-receiving resonance circuit 32-side to the battery 26-side. According to another embodiment, the power-receiving resonance circuit 32, the relay 44 and the resistance 46, the charging circuit 40, and the charging relay 42 may be arranged in this sequence. According to another embodiment, the power-receiving resonance circuit 32, the charging circuit 40, the relay 44 and the resistance 46, and the charging relay 42 may be arranged in this sequence.

The motor vehicle 20 is the electric vehicle according to the above embodiment, but may be any vehicle equipped with a battery and a power receiving device, for example, a hybrid vehicle or a fuel cell vehicle.

The embodiment describes the non-contact power transmitting/receiving system 10, but the invention may be implemented as the power receiving device 30 or the power transmission device 130 included in this non-contact power transmitting/receiving system 10.

The following describes the correspondence relationship between the primary components of the embodiment and the primary components of the invention described in Solution to Problem in Summary. The power transmission device 130 of the embodiment including the power transmission unit 131, the power transmission ECU 170 and the communication unit 180 corresponds to the "power transmission device". The battery 26 corresponds to the "battery". The power receiving device 30 including the power receiving unit 31, the vehicle ECU 70 and the communication unit 80 corresponds to the "power receiving device". The motor vehicle 20 corresponds to the "vehicle".

In the non-contact power transmitting/receiving system of the above aspect, when the power difference is greater than the reference value, the transmitted power that is to be transmitted from the power transmission device may be reduced such that the larger power difference provides the larger reduction of the transmitted power. In another configuration of the above aspect, when the power difference is greater than the reference value, the transmitted power that is to be transmitted from the power transmission device may be gradually reduced until the power difference becomes equal to or less than the reference value. These configurations more effectively suppress heat generation in the power receiving device.

In the non-contact power transmitting/receiving system of the above aspect, the power transmission device may have a power transmission resonance circuit including a power transmission coil. The power receiving device may have a power-receiving resonance circuit including a coil, and a charging circuit that is configured to convert an AC power received by the power-receiving resonance circuit into a DC power and supply the converted DC power to the battery.

According to another aspect of the invention, there is provided a power receiving device in a non-contact power transmitting/receiving system which includes a power transmission device; and a vehicle including a battery and the power receiving device that is configured to receive electric power from the power transmission device in a contactless manner and charge the battery. In course of charging the battery with an electric power transmitted from the power transmission device to the power receiving device in a contactless manner, the power receiving device may be configured to send a command to the power transmission device to reduce a transmitted power that is to be transmitted from the power transmission device when a power difference between a transmitted power of the power transmission device and a received power of the power receiving device is greater than a reference value, than the transmitted power when the power difference is equal to or less than the reference value.

In course of charging the battery with the electric power transmitted from the power transmission device to the power receiving device in a contactless manner, the power receiving device sends the command to the power transmission device to reduce the transmitted power that is to be transmitted from the power transmission device when the power difference between the transmitted power of the power transmission device and the received power of the power receiving device is greater than the reference value, than the transmitted power when the power difference is equal to or less than the reference value. This configuration suppresses heat generation in each component of the power receiving device and heat generation in the periphery of the power receiving device and thereby suppresses the temperature of the component and the temperature of the periphery from increasing to relatively high temperatures. Additionally, this configuration suppresses size expansion or an increase in total number of components of, for example, the power receiving device, compared with a configuration equipped with a cooling device for cooling down such respective parts.

In the power receiving device of the above aspect, when the power difference is greater than the reference value, the power receiving device may be configured to send a command to the power transmission device to reduce the transmitted power that is to be transmitted from the power transmission device, such that the larger power difference provides the larger reduction of the transmitted power. In another configuration of the above aspect, when the power difference is greater than the reference value, the power receiving device may be configured to send a command to the power transmission device to gradually reduce the transmitted power that is to be transmitted from the power transmission device, until the power difference becomes equal to or less than the reference value. These configurations more effectively suppress heat generation in the power receiving device.

According to another aspect of the invention, there is provided a power transmission device in a non-contact power transmitting/receiving system which includes the power transmission device; and a vehicle including a battery and a power receiving device that is configured to receive electric power from the power transmission device in a contactless manner and charge the battery. In course of charging the battery with an electric power transmitted from the power transmission device to the power receiving device in a contactless manner, the power transmission device may be configured to reduce a transmitted power that is to be transmitted from the power transmission device to the power receiving device when a power difference between a transmitted power of the power transmission device and a received power of the power receiving device is greater than a reference value, than the transmitted power when the power difference is equal to or less than the reference value.

In course of charging the battery with the electric power transmitted from the power transmission device to the power receiving device in a contactless manner, the power transmission device reduces the transmitted power that is to be transmitted from the power transmission device to the power receiving device when the power difference between the transmitted power of the power transmission device and the received power of the power receiving device is greater than the reference value, than the transmitted power when the power difference is equal to or less than the reference value. This configuration suppresses heat generation in each component of the power receiving device and heat generation in the periphery of the power receiving device and thereby suppresses the temperature of the component and the temperature of the periphery from increasing to relatively high temperatures. Additionally, this configuration suppresses size expansion or an increase in total number of components of, for example, the power receiving device, compared with a configuration equipped with a cooling device for cooling down such respective parts.

In the power transmission device of the above aspect, when the power difference is greater than the reference value, the power transmission device may be configured to reduce the transmitted power that is to be transmitted from the power transmission device to the power receiving device, such that the larger power difference provides the larger reduction of the transmitted power. In another configuration of the above aspect, when the power difference is greater than the reference value, the power transmission device may be configured to gradually reduce the transmitted power that is to be transmitted from the power transmission device to the power receiving device, until the power difference becomes equal to or less than the reference value. These configurations more effectively suppress heat generation in the power receiving device.

The correspondence relationship between the primary components of the embodiment and the primary components of the invention, regarding which the problem is described in Summary of Invention, should not be considered to limit the components of the invention, regarding which the problem is described in Summary of Invention, since the embodiment is only illustrative to specifically describes the aspects of the invention, regarding which the problem is described in Summary of Invention. In other words, the invention, regarding which the problem is described in Summary of Invention, should be interpreted on the basis of the description in the Summary of Invention, and the embodiment is only a specific example of the invention, regarding which the problem is described in Summary of Invention.

The aspect of the invention is described above with reference to the embodiment. The invention is, however, not limited to the above embodiment but various modifications and variations may be made to the embodiment without departing from the scope of the invention.

INDUSTRIAL APPLICABILITY

The invention is applicable to, for example, the manufacturing industry of non-contact power transmitting/receiving systems.

The invention claimed is:
1. A non-contact power transmitting/receiving system, comprising:
a power transmission device; and a vehicle including a battery and a power receiving device that is configured to receive electric power from the power transmission device in a contactless manner and charge the battery, wherein
in course of charging the battery with an electric power transmitted from the power transmission device to the power receiving device in a contactless manner, when a power difference between a transmitted power of the power transmission device and a received power of the power receiving device is greater than a reference value, the transmitted power of the power transmission device is reduced compared to the transmitted power when the power difference is equal to or less than the reference value.

2. The non-contact power transmitting/receiving system according to claim 1,
wherein when the power difference is greater than the reference value, the transmitted power of the power transmission device is reduced such that the larger power difference provides the larger reduction of the transmitted power.

3. The non-contact power transmitting/receiving system according to claim 1,
wherein when the power difference is greater than the reference value, the transmitted power of the power transmission device is gradually reduced until the power difference becomes equal to or less than the reference value.

4. The non-contact power transmitting/receiving system according to claim 1,
wherein the power transmission device has a power transmission resonance circuit including a power transmission coil, and
the power receiving device has a power-receiving resonance circuit including a coil, and a charging circuit that is configured to convert an AC power received by the power-receiving resonance circuit into a DC power and supply the converted DC power to the battery.

5. A power receiving device in a non-contact power transmitting/receiving system, the non-contact power transmitting/receiving system comprising a power transmission device; and a vehicle including a battery and the power receiving device that is configured to receive electric power from the power transmission device in a contactless manner and charge the battery,
in course of charging the battery with an electric power transmitted from the power transmission device to the power receiving device in a contactless manner, the power receiving device being configured to send a command to the power transmission device when a power difference between a transmitted power of the power transmission device and a received power of the power receiving device is greater than a reference value to reduce the transmitted power of the power transmission device compared to the transmitted power when the power difference is equal to or less than the reference value.

6. The power receiving device according to claim 5,
when the power difference is greater than the reference value, the power receiving device being configured to send a command to the power transmission device to reduce the transmitted power that is to be transmitted from the power transmission device, such that the larger power difference provides the larger reduction of the transmitted power.

7. The power receiving device according to claim 5,
when the power difference is greater than the reference value, the power receiving device being configured to send a command to the power transmission device to gradually reduce the transmitted power that is to be transmitted from the power transmission device, until the power difference becomes equal to or less than the reference value.

8. A power transmission device in a non-contact power transmitting/receiving system, the non-contact power transmitting/receiving system comprising the power transmission device; and a vehicle including a battery and a power receiving device that is configured to receive electric power from the power transmission device in a contactless manner and charge the battery,
in course of charging the battery with an electric power transmitted from the power transmission device to the power receiving device in a contactless manner, the power transmission device being configured when a power difference between a transmitted power of the power transmission device and a received power of the power receiving device is greater than a reference value to reduce the transmitted power of the power transmission device compared to the transmitted power when the power difference is equal to or less than the reference value.

9. The power transmission device according to claim 8,
wherein when the power difference is greater than the reference value, the power transmission device being configured to reduce the transmitted power that is to be transmitted from the power transmission device to the power receiving device, such that the larger power difference provides the larger reduction of the transmitted power.

10. The power transmission device according to claim 8,
wherein when the power difference is greater than the reference value, the power transmission device being configured to gradually reduce the transmitted power that is to be transmitted from the power transmission device to the power receiving device, until the power difference becomes equal to or less than the reference value.

\* \* \* \* \*